United States Patent Office 3,107,139
Patented Oct. 15, 1963

3,107,139
FILMS AND THEIR PRODUCTION
Jack Witherington Cornforth, Harpenden, and Charles Hampden Crooks, Welwyn, England, assignors to Imperial Chemical Industries Limited, London, England, a corporation of Great Britain
No Drawing. Filed Sept. 9, 1957, Ser. No. 682,598
Claims priority, application Great Britain Sept. 12, 1956
3 Claims. (Cl. 18—48)

This invention relates to improved films comprising synthetic linear polyesters, particularly polyesters derived essentially from ethylene glycol and terephthalic acid.

It is an object of the invention to provide improved oriented polyesters films, and a process for the production of such films.

In accordance with the present invention, a process for the production of an oriented film from a substantially amorphous, extruded film of a synthetic linear polyester derived essentially from ethylene glycol and terephthalic acid comprises drawing the film in the direction transverse to the direction of extrusion to at least 3.3 times, preferably from 3.3 times to 4.0 times its dimension in the said direction immediately before drawing, drawing the film also in the direction of extrusion sufficiently for biaxial orientation to be introduced by said drawing operations, and heat setting the biaxially oriented film at a temperature of from 150° C. to 230° C.

By the term "drawing" as used throughout this specification we mean stretching the film at a temperature below its softening temperature but above the second order transition temperature, to introduce molecular orientation into the film. The film is preferably drawn forward, in the direction of extrusion, before it is drawn in the transverse direction, and the preferred forward draw ratio is from 2.75:1 to 3.5:1. Such a draw ratio is sufficient to ensure stable drawing conditions in this direction.

Oriented films of polyethylene terephthalate have previously been produced by drawing them in both the longitudinal and transverse direction to about 3 times their original dimensions or even less. The important advantage given by the process of the present invention is that by drawing the film transversely to an extent not less than 3.3 times its original width, all points across the film draw proportionally. We have found that when the film is transversely drawn to a ratio of less than 3.3:1, those portions of the film that are slightly thinner are drawn more than the slightly thicker portions. Therefore, at such draw ratios the slight thickness variations that inevitably occur across the width of the film are proportionally increased by the drawing process. By contrast, the process of the present invention ensures that all thicknesses of the film draw proportionally, and thus a smaller thickness variation across the width of the finished film can be maintained.

The film may be drawn separately in the two directions or simultaneously in both directions, preferably at a temperature of from 78° C. to 125° C. In the former case, it is preferably drawn first in the machine direction at a temperature of from 78° C. to 100° C., and then in the transverse direction at a temperature from 80° C. to 125° C. Simultaneous two-way drawing is generally preferred for film produced by a tubular process. The film may be heated to the desired temperature by any convenient method, for example by radiant or infra red heating, by hot air, or by contact with heated surfaces or liquids.

Various known types of apparatus designed to stretch continuous lengths of film in the machine and transverse directions are suitable for use in the process of this invention. For example, the film may conveniently be drawn in the machine direction by passing it between or round a pair or series of slow rolls, which may be heated to the desired drawing temperature, and then between or round a pair or series of fast rolls, the two pairs or series of rolls being closely spaced so that the film is supported upon the rolls over most of the region in which it is subjected to tension, and transverse shrinkage is reduced to a minimum. A useful alternative method of heating the film is by means of radiant heat applied to as small a length of film, in the desired drawing region, as is consistent with the need to heat the film to the desired drawing temperature. In this way the drawing zone may be localised and the maximum improvement in properties obtained in the film, combined with only a small shrinkage in the transverse direction. Suitable known forms of apparatus for drawing the film in the transverse direction include, for example, those comprising a stenter frame or a pair of revolving, angularly disposed, grooved discs that are adapted to coact with opposite margins of the film, each margin being held in the groove of the disc by means of an endless belt.

Our invention is illustrated but in no way limited by the following example.

Example

In a continuous, integrated process a flat film of polyethylene terephthalate was extruded, quenched, and drawn in the direction of extrusion and then in the transverse direction under completely and continuously uniform conditions. The longitudinal drawing step was carried out at a temperature of 80° C. to a draw ratio of 3:1 and the film was then passed to a stenter where it was transversely drawn at a temperature of 90° C. Over consecutive periods, the film was drawn transversely to draw ratios of 3:1, 3.5:1 and 4:1, and for each sample the average percentage variation in thickness from the mean thickness was calculated, using thickness measurements made across whole widths of the film at a number of points along the length of the sample. The process was repeated during a number of continuous runs of the process, each varying in the dimensional quality of the film produced but each giving film having a mean thickness of 0.04 inch after longitudinal drawing and before it was passed to the stenter for transverse drawing. The percentage variations found in the thickness of the samples were as follows:

| Draw ration of sample | Final variation, percent | | |
|---|---|---|---|
| | 3:1 | 3.5:1 | 4:1 |
| Run No. 1 | 7.7 | 6.0 | 4.8 |
| Run No. 2 | 19.0 | 15.0 | 13.0 |
| Run No. 3 | 48.0 | 30.0 | 26.0 |

We claim:
1. A process for the production of an oriented film from a substantially amorphous, extruded film of a synthetic linear polyester derived essentially from ethylene glycol and terephthalic acid comprising the steps of draw- ing the film in the direction of extrusion to a draw ratio within the range of from 2.75:1 to 3.5:1 and in the direction transverse to the direction of extrusion to a draw ratio within the range of from 3.3:1 to 4.0:1, and thereafter heat setting the biaxially oriented film so produced at a temperature of from 150° C. to 230° C.

2. A process according to claim 1, wherein the film is drawn in the direction of extrusion before it is drawn in the direction transverse thereto.

3. A process according to claim 1, wherein the film is drawn in the direction of extrusion at a temperature of from 78° C. to 100° C., and then in the transverse direction at a temperature of from 80° C. to 125° C.

References Cited in the file of this patent

UNITED STATES PATENTS

| | | |
|---|---|---|
| 2,578,899 | Pace | Dec. 18, 1951 |
| 2,627,088 | Alles et al. | Feb. 3, 1953 |
| 2,728,941 | Alles et al. | Jan. 3, 1956 |
| 2,767,435 | Alles et al. | Oct. 23, 1956 |
| 2,823,421 | Scarlett | Feb. 18, 1958 |